United States Patent
Kim et al.

(10) Patent No.: US 11,226,783 B2
(45) Date of Patent: Jan. 18, 2022

(54) DISPLAY SYSTEM, DISPLAY APPARATUS, AND CONTROL METHOD THEREOF

(71) Applicant: SAMSUNG ELECTRONICS CO., LTD., Suwon-si (KR)

(72) Inventors: Moonyoung Kim, Suwon-si (KR); Jeongil Kang, Suwon-si (KR); Sinwook Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/558,406

(22) Filed: Sep. 3, 2019

(65) Prior Publication Data
US 2020/0083816 A1 Mar. 12, 2020

(30) Foreign Application Priority Data
Sep. 12, 2018 (KR) .................. 10-2018-0109243

(51) Int. Cl.
*H02M 3/335* (2006.01)
*G06F 3/14* (2006.01)
(Continued)

(52) U.S. Cl.
CPC .............. *G06F 3/14* (2013.01); *G09G 5/00* (2013.01); *G09G 2330/00* (2013.01);
(Continued)

(58) Field of Classification Search
CPC ....... H02M 3/33561; H02M 2001/123; H02M 2001/0067; H02M 2001/0032;
(Continued)

(56) References Cited

U.S. PATENT DOCUMENTS

| 4,626,977 A | * | 12/1986 | Carnes | ................. H04N 3/1853 363/21.09 |
| 5,499,184 A | * | 3/1996 | Squibb | .............. H02M 3/33523 363/100 |

(Continued)

FOREIGN PATENT DOCUMENTS

| CN | 201601359 | 10/2010 |
| EP | 2 610 843 | 7/2013 |

(Continued)

OTHER PUBLICATIONS

International Search Report and Written Opinion dated Dec. 18, 2019 in counterpart International Application No. PCT/KR2019/011323.

(Continued)

*Primary Examiner* — Harry R Behm
(74) *Attorney, Agent, or Firm* — Nixon & Vanderhye P.C.

(57) ABSTRACT

A display system is disclosed. The display system includes an electronic device including first and second interfaces and a display apparatus. The electronic device is configured to: rectify external alternating current (AC) power by direct current (DC) power based on a first ground, convert the DC power into power based on a second ground, provide the converted power to the display apparatus through a first interface connected to the second ground, and provide a signal received from an external device through a second interface connected to an earth ground to the display apparatus through the first interface, wherein a ground of the display apparatus is the same as the second ground and the second ground is different from the earth ground.

19 Claims, 13 Drawing Sheets

(51) Int. Cl.
*G09G 5/00* (2006.01)
*H02M 1/00* (2006.01)
*H02M 1/12* (2006.01)

(52) U.S. Cl.
CPC ..... *G09G 2330/04* (2013.01); *G09G 2370/16* (2013.01); *G09G 2370/18* (2013.01); *H02M 1/0032* (2021.05); *H02M 1/0067* (2021.05); *H02M 1/123* (2021.05); *H02M 3/33561* (2013.01)

(58) Field of Classification Search
CPC .. H02M 1/123; H02M 1/0067; H02M 1/0032; G09G 2330/00; G09G 2370/18
See application file for complete search history.

(56) References Cited

U.S. PATENT DOCUMENTS

| | | | |
|---|---|---|---|
| 5,671,131 A * | 9/1997 | Brown | H02M 3/28 363/21.15 |
| 6,021,499 A * | 2/2000 | Aleshi | G06F 1/26 363/15 |
| 7,541,691 B2 | 6/2009 | Lee et al. | |
| 8,164,932 B2 | 4/2012 | Sims et al. | |
| 8,867,947 B2 | 10/2014 | Yamazawa | |
| 9,391,454 B2 | 7/2016 | Hsu | |
| 9,444,251 B2 | 9/2016 | Woo et al. | |
| 9,735,692 B1 | 8/2017 | Lu et al. | |
| 9,906,071 B2 | 2/2018 | Kim | |
| 2006/0145630 A1* | 7/2006 | Jeon | H05B 41/282 315/209 R |
| 2006/0214599 A1* | 9/2006 | Ogawa | H02M 3/33507 315/169.4 |
| 2006/0288139 A1* | 12/2006 | Lee | G06F 1/181 710/62 |
| 2008/0007926 A1 | 1/2008 | Lee et al. | |
| 2009/0002901 A1* | 1/2009 | Matsumoto | H03K 17/08122 361/18 |
| 2009/0085576 A1* | 4/2009 | Lenzie | H02H 3/16 324/510 |
| 2010/0045590 A1* | 2/2010 | Kumamoto | G02F 1/13452 345/102 |
| 2011/0128153 A1 | 6/2011 | Sims et al. | |
| 2013/0169612 A1* | 7/2013 | Woo | H02J 1/00 345/211 |
| 2014/0254994 A1* | 9/2014 | Cho | H01B 7/328 385/101 |
| 2014/0354579 A1* | 12/2014 | Paskalev | G06F 3/04182 345/174 |
| 2014/0368179 A1 | 12/2014 | Lee et al. | |
| 2015/0185791 A1* | 7/2015 | Hall | H01B 7/2825 361/679.21 |
| 2015/0188429 A1 | 7/2015 | Taya | |
| 2015/0207456 A1 | 7/2015 | Han et al. | |
| 2016/0141951 A1 | 5/2016 | Mao et al. | |
| 2016/0189602 A1 | 6/2016 | Yang | |
| 2016/0196803 A1* | 7/2016 | Reynolds | G09G 3/20 345/174 |
| 2017/0006688 A1 | 1/2017 | Dai et al. | |
| 2017/0093158 A1 | 3/2017 | Perper et al. | |
| 2017/0278658 A1 | 9/2017 | Kang | |
| 2017/0310224 A1 | 10/2017 | Joo et al. | |
| 2017/0357366 A1 | 12/2017 | Lee et al. | |
| 2018/0019681 A1* | 1/2018 | Fouque | H02M 3/33584 |
| 2018/0269701 A1* | 9/2018 | Dai | H02M 3/33507 |
| 2019/0114969 A1* | 4/2019 | Hong | G09G 3/3258 |
| 2019/0157910 A1 | 5/2019 | Choi et al. | |
| 2019/0334373 A1 | 10/2019 | Jang et al. | |

FOREIGN PATENT DOCUMENTS

| | | | |
|---|---|---|---|
| EP | 3 270 584 A1 | 1/2018 | |
| EP | 3 451 493 A1 | 3/2019 | |
| JP | H09331410 A | 12/1997 | |
| JP | 10-171404 | 6/1998 | |
| JP | 2006-238676 A | 9/2006 | |
| JP | 2009-130423 | 6/2009 | |
| JP | 5331219 B2 | 10/2013 | |
| JP | 5640491 B2 | 12/2014 | |
| KR | 10-0315771 | 11/2001 | |
| KR | 10-2008-0110376 | 12/2008 | |
| KR | 10-1124042 | 3/2012 | |
| KR | 10-2015-0072508 | 6/2015 | |
| KR | 10-2015-0088132 | 7/2015 | |
| KR | 10-2016-0125732 A | 11/2016 | |
| KR | 10-2017-0025197 | 3/2017 | |
| KR | 10-2018-0009175 | 1/2018 | |
| KR | 10-2018-0012503 | 2/2018 | |
| KR | 10-1925142 | 2/2019 | |
| KR | 10-2019-0063569 | 6/2019 | |
| WO | WO-2017084528 A1 * | 5/2017 | H02M 3/33507 |
| WO | WO 2018/016751 | 1/2018 | |
| WO | WO 2018/139802 | 8/2018 | |

OTHER PUBLICATIONS

Extended Search Report dated Dec. 13, 2019 in counterpart European Patent Application No. 19195578.0.

"Designing Multiple Output Flyback Power Supplies,"Jan. 1, 2001, retrieved from the internet: url:https://piexpertonline.power.com/help/piexpert/en/index.htm#topics/appendixa.htm, 7 pages [retrieved Dec. 4, 2019].

European Search Report dated Nov. 6, 2020 for EP Application No. 20179422,9.

PCT Search Report dated Sep. 21, 2020 for PCT/KR2020/007509; 3 pgs.

PCT Written Opinion dated Sep. 21, 2020 for PCT/KR2020/007509; 7 pgs.

European Examination Report dated Apr. 28, 2021 for EP Application No. 19195578.0.

European Examination Report dated Apr. 16, 2021 for EP Application No. 20179422.9.

* cited by examiner

DISPLAY SYSTEM, DISPLAY APPARATUS, AND CONTROL METHOD THEREOF

CROSS-REFERENCE TO RELATED APPLICATIONS

This application is based on and claims priority under 35 U.S.C. § 119 to Korean Patent Application No. 10-2018-0109243, filed on Sep. 12, 2018, in the Korean Intellectual Property Office, the disclosure of which is incorporated by reference herein in its entirety.

BACKGROUND

Field

The disclosure relates to a display system, a display apparatus, and a control method thereof, and for example, to a display system which supplies power to a display apparatus, a display apparatus, and a control method thereof.

Description of Related Art

Various types of display apparatuses have recently been developed and have become prevalent in line with the development of electronic technologies, and demand for large display apparatuses has increased.

Such a large display apparatus requires high power, and thus, a power adapter supplying power and the display apparatus need to be connected by a thick cable, degrading design and user convenience.

Meanwhile, a power adapter having a high output voltage may have a small magnitude of current to reduce a thickness of a cable but require the same isolated voltage with respect to a ground as with a user in terms of stability. Therefore, a switched mode power supply (SMPS) of a large display apparatus must be configured as an isolated power supply. However, an isolation-type circuit configuration increases a volume of the display apparatus and manufacturing cost.

There has been a movement toward providing a high voltage required for driving large display apparatuses and enhancement of stability of users although an adapter and a display apparatus are connected by a relatively thin cable. There also has been demand for reducing the volume and manufacturing cost of the display apparatuses.

SUMMARY

Example embodiments of the disclosure address the above disadvantages and other disadvantages not described above. Also, the disclosure is not required to overcome the disadvantages described above, and an embodiment of the disclosure may not overcome any of the problems described above.

The disclosure provides a display system in which power is transmitted and received using a single cable between an electronic device and a display apparatus, a display apparatus, and a control method thereof.

The disclosure also provides a display system in which a display apparatus is connected to an independent ground terminal and power is supplied to the display apparatus using a relatively thin single cable, a display apparatus and a control method thereof.

According to an example embodiment of the disclosure, a display system includes: an electronic device comprising circuitry including first and second interfaces; and a display apparatus, wherein the electronic device is configured to: rectify received external alternating current (AC) power by direct current (DC) power based on a first ground, convert the DC power into power based on a second ground, provide the converted power to the display apparatus through the first interface connected to the second ground, and provide a signal received from an external device through the second interface connected to an earth ground to the display apparatus through the first interface, wherein a ground of the display apparatus is the same as the second ground and the second ground is different from the earth ground.

The electronic device may include: first and second isolated power converters wherein the first isolated power converter may be configured to convert the DC power into driving power based on the second ground and output the converted driving power to the display apparatus through the first interface, and the second isolated power converter configured to convert the DC power into standby power based on the second ground and output the converted standby power to the display apparatus through the first interface, and the display apparatus may include a non-isolated power converter and the display apparatus is configured to convert any one of the driving power and the standby power through the non-isolated converter based on a mode of the display apparatus.

The second isolated power converter may be configured to convert the DC power into power based on the earth ground and output the converted power to the second interface.

The electronic device may further include: a feedback circuit configured to identify a size of a load of the external device connected to the second interface; and a controller configured to control an intensity of power based on the earth ground output through the second isolated power converter based on the size of the load.

The first interface may be connected to the display apparatus through a single cable including a ground line corresponding to the second ground, a first voltage line delivering the driving power, a second voltage line delivering the standby power, and an optical cable delivering a signal received from the external device.

The electronic device may include a capacitor and a resistor connected to the second ground and the earth ground, and be configured to filter a noise received from the display apparatus using the capacitor and the resistor.

The electronic device may include a wireless communication interface and be configured to provide a signal received from the external device to the display apparatus through the wireless communication interface.

The first ground may be a power ground and the second ground may be a frame ground.

The electronic device may include: a protective circuit configured to interrupt provision of power provided to the display apparatus through the first interface, based on the power exceeding a predetermined threshold value.

According to another example embodiment of the disclosure, a display apparatus includes: a display; a driving module comprising driving circuitry configured to control driving of the display; an interface connected to an external electronic device; and a power receiving module comprising power receiving circuitry configured to provide power received from the external electronic device to the driving module through the interface, wherein the power receiving module is connected to the same ground as a ground of the external electronic device, and a ground of the power receiving module is different from an earth ground.

The display apparatus may further include: a main module comprising control circuitry, wherein the power receiving module may include a non-isolated converter and a controller, and the controller may be configured to convert driving power, among the driving power and standby power received through the interface, through the non-isolated converter and to provide the converted driving power to the driving module and the main module based on the display apparatus being in a first mode, and to convert the standby power through the non-isolated converter and to provide the converted standby power to the main module based on the display apparatus being in a second mode.

According to another example embodiment of the disclosure, a method of controlling a display system including an electronic device and a display apparatus, includes: rectifying external alternating current (AC) power by direct current (DC) power based on a first ground through the electronic device; converting the DC power into power based on a second ground and providing the converted power to the display apparatus through a first interface connected to the second ground; and providing a signal received from an external device through a second interface connected to an earth ground to the display apparatus through the first interface, wherein a ground of the display apparatus is the same as the second ground and the second ground is different from the earth ground.

The electronic device may include: first and second isolated power converters, and the converting of the DC power into power based on the second ground and providing the converted power to the display apparatus may include: converting the DC power into driving power based on the second ground and outputting the converted driving power to the display apparatus through the first isolated power converter; and converting the DC power into standby power based on the second ground and outputting the converted standby power to the display apparatus through the second isolated power converter, wherein the display apparatus may include a non-isolated power converter and convert any one of the driving power and the standby power through the non-isolated power converter based on a mode of the display apparatus.

The method may further include: converting the DC power into power based on the earth ground and outputting the converted power to the second interface through the second isolated converter.

The method may further include: identifying a size of a load of the external device connected to the second interface, wherein the converting of the DC power into power based on the ground and outputting the converted power to the second interface may include: controlling an intensity of power based on the earth ground output through the second isolated power converter based on the size of the load.

The first interface may be connected to the display apparatus through a single cable including a ground line corresponding to the second ground, a first voltage line delivering the driving power, a second voltage line delivering the standby power, and an optical cable delivering a signal received from the external device.

The electronic device may include a capacitor and a resistor connected to the second ground and the earth ground, wherein the method may further include: filtering a noise received from the display apparatus using the capacitor and the resistor.

The method may further include: providing a signal received from the external device to the display apparatus through a wireless communication interface.

The first ground may be a power ground and the second ground may be a frame ground.

The method may further include: interrupting provision of power provided to the display apparatus through the first interface, based on the power exceeding a predetermined threshold value.

According to various example embodiments of the disclosure, the electronic device and the display apparatus may transmit and receive power using a cable thinner than the related art, and thus, user convenience and stability can be improved.

In addition, the display apparatus may be configured as a non-isolated circuit, thereby reducing a volume and manufacturing cost of the display apparatus.

Additional and/or other aspects and advantages of the disclosure will be set forth in part in the description which follows and, in part, will be apparent from the description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
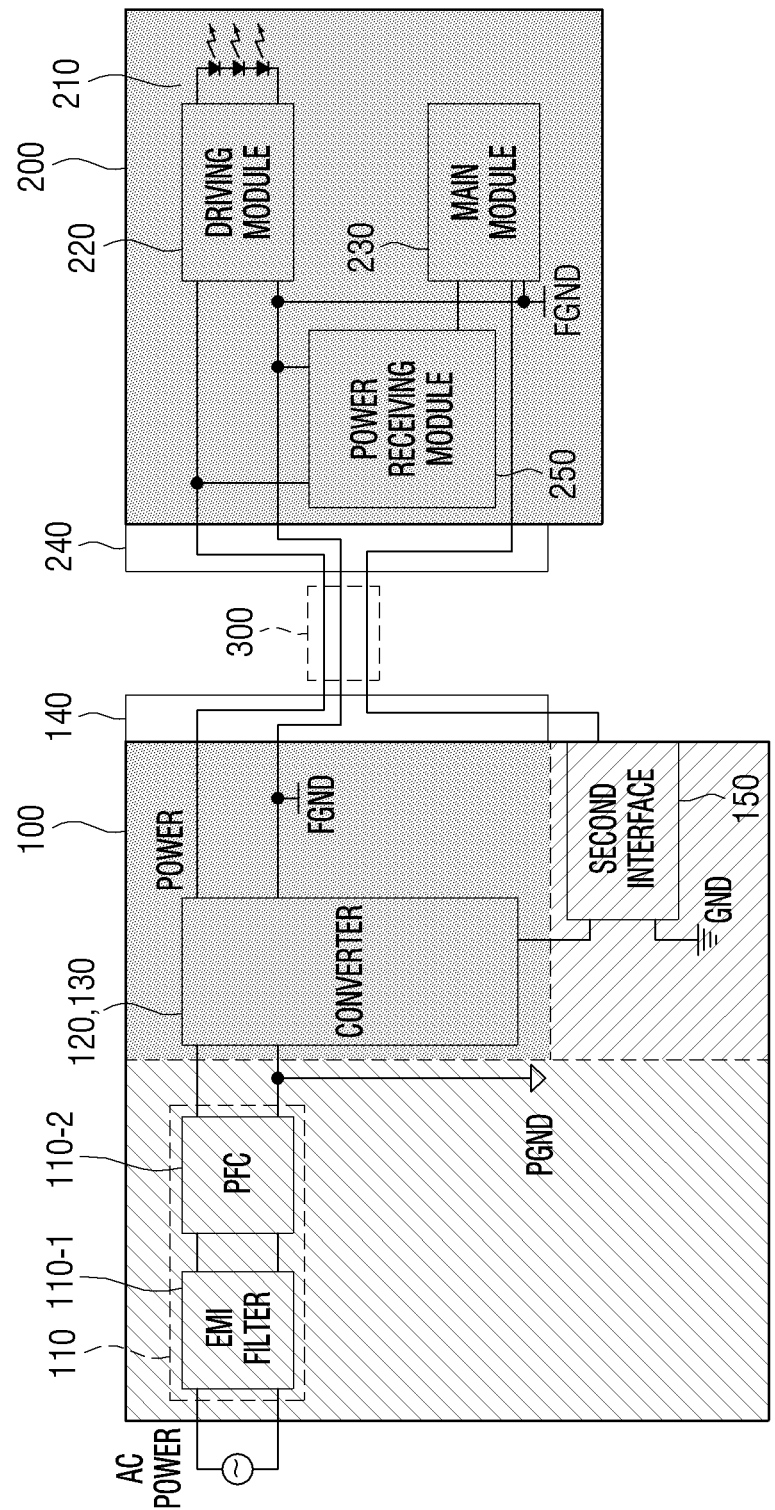
FIG. 1 is a block diagram illustrating an example configuration of a display system according to an embodiment of the disclosure.

Terms used in the description of the various example embodiments of the disclosure are briefly described and then the various example embodiments of the disclosure will be described in greater detail.

The terms used in the embodiments of the disclosure are general terms which are widely used now and selected considering the functions of the disclosure. However, the terms may vary depending on the intention of a person skilled in the art, a precedent, or the advent of new technology. In addition, a term may be arbitrarily selected. In this case, the meaning of the term will be explained in the corresponding description. Therefore, terms used in the disclosure may be defined based on a meaning of the terms and contents described in the disclosure, not simply based on names of the terms.

Hereinafter, various example embodiments of the disclosure are described with reference to the accompanying drawings. However, it should be appreciated that the disclosure is not limited to any specific embodiment and all modifications, equivalents and/or alternatives thereof also belong to the scope of the disclosure. Descriptions of well-known functions and structures incorporated herein may be omitted to avoid obscuring the subject matter of the disclosure.

In the disclosure, terms including, an ordinal number such as 'first', 'second', etc. may be used to describe various components, but the components are not to be understood as being limited to the terms. The terms are only used to differentiate one component from other components.

Some terms used herein may be provided merely to describe a specific embodiment without limiting the scope of another embodiment. In the description, the singular forms "a", "an" and "the" are intended to include the plural forms as well, unless the context clearly indicates otherwise. It will be understood that the terms "comprising", "including", "having" and variants thereof specify the presence of stated features, numbers, steps, operations, elements, components, and/or groups thereof, but do not preclude the presence or addition of one or more other features, numbers, steps, operations, elements, components, and/or groups thereof.

In the description, the word "module" or "unit" may refer, for example, to a software component, a hardware component, or any combination thereof, which is capable of carrying out at least one function or operation. A plurality of modules or units may be integrated into at least one module and implemented using at least one processor (not shown) except for those modules or units that need to be implemented in specific hardware.

Hereinafter, various example embodiments will be described in greater detail with reference to the accompanying tables and drawings. As those skilled in the art will appreciate, the described embodiments may be modified in various different ways, all without departing from the spirit or scope of the disclosure. In the accompanying drawings, a portion irrelevant to description of the disclosure may be omitted for clarity. Like reference numerals refer to like elements throughout.

FIG. 1 is a block diagram illustrating an example configuration of a display system according to an embodiment of the disclosure.

Referring to FIG. 1, a display system 1000 includes an electronic device 100 and a display apparatus 200.

The electronic device 100 includes a rectifier 110, converters 120 and 130, a first interface 140, and a second interface 150.

A power supply line of the electronic device 100 may be connected to a power outlet providing commercial power (e.g., 90 to 264 V), and the electronic device 100 may transmit commercial power to the display apparatus 200. The electronic device 100 may be realized as various types of devices that supply power to the display apparatus 200.

The rectifier 110 of the electronic device 100 may include an electromagnetic interference (EMI) filter 110-1 and a power factor correction (PFC) circuit 110-2. The EMI filter 110-1 rectifies and smooths the input commercial power and outputs to DC power having a certain level. A half-wave or full-wave rectification circuit may be used for rectification and a capacitor (not shown) may be connected in parallel to an output terminal of the rectification circuit for smoothing.

The PFC 110-2 circuit may cancel out reactive power to satisfy a PF regulation of an electronic product.

The rectifier 110 according to an embodiment of the disclosure may have the other end connected to a first ground terminal. Therefore, the rectifier 110 may rectify the external AC power to DC power based on a first ground. The first ground may, for example, be a power ground PGND.

The converters 120 and 130 of the electronic device 100 according to an embodiment of the disclosure may each have one end connected to a second ground terminal. Accordingly, the converters 120 and 130 may convert the rectified DC power from the rectifier 110 to power having a predetermined intensity based on the second ground.

The electronic device 100 according to an embodiment of the disclosure may provide power to the display apparatus 200 via the first interface 140 connected to the second ground. The display apparatus 200 may be connected to the second ground terminal. For example, the first interface 140 of the electronic device 100 and the display apparatus 200 may be connected to the second ground, and the electronic device 100 may transmit commercial power to the display apparatus 200 via the first interface 140. The second ground to which the first interface 140 and the display apparatus 200 are connected may be a ground different from an earth ground (e.g., a frame ground (FGND)).

In addition, the electronic device 100 according to an embodiment of the disclosure may receive a signal from an external device via the second interface 150 connected to the earth ground (GND). In addition, the electronic device 100 may provide the signal received from the external device to the display apparatus 200 through the first interface 140.

Figure 2:
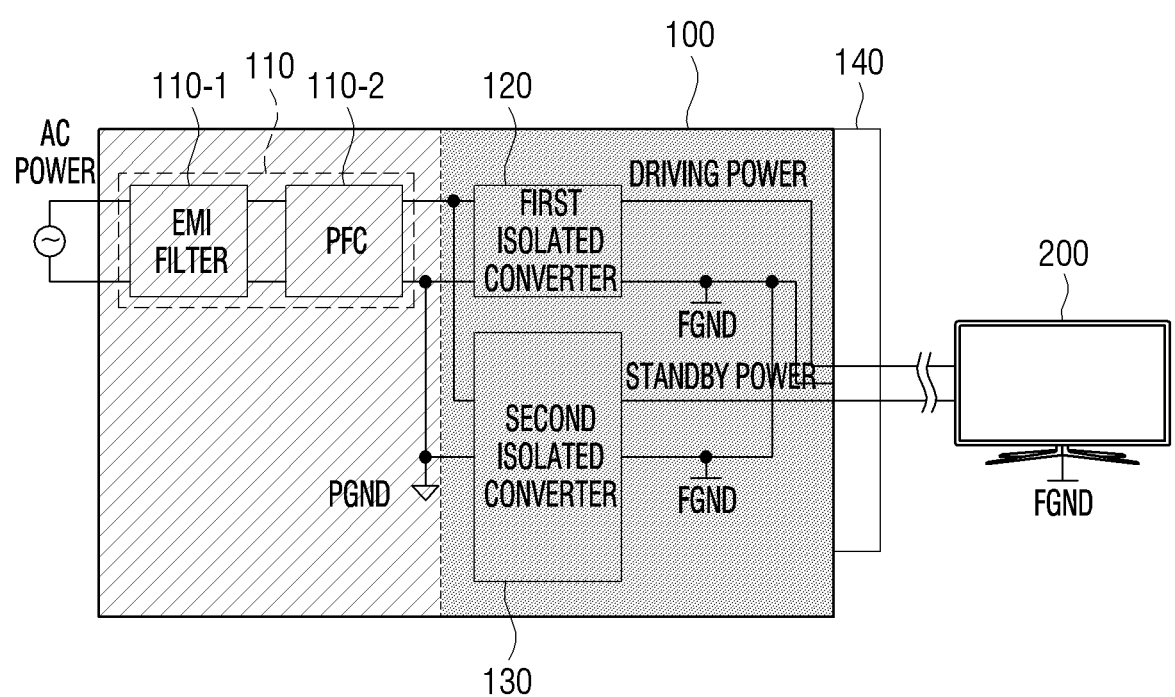
FIG. 2 is a block diagram illustrating an example configuration of an electronic device according to an embodiment of the disclosure.

FIG. 2 is a block diagram illustrating an example configuration of an electronic device according to an embodiment of the disclosure.

The electronic device 100 according to an embodiment of the disclosure may include a first isolated converter 120 (e.g., first isolated power converter) and a second isolated converter 130 (e.g., second isolated power converter).

The first and second isolated converters 120 and 130 may convert the rectified power from the rectifier 110 to a predetermined intensity.

Converters may include an isolated converter and a non-isolated converter. The isolated converter may refer, for example, to a converter in which a primary side (input part) and a secondary side (output part) are isolated by a transformer. The electronic device 100 according to an embodiment of the disclosure may include the first and second isolated converters 120, 130 using a transformer. The transformer may refer, for example, to a device in which a primary winding and a secondary winding are wound around a core. When a current change occurs in the primary winding, induced electromotive force is generated in the secondary winding due to a change in magnetic flux passing through the core, and an induced current flows. The other end (e.g., a secondary side) of each of the first and second isolated converters 120 and 130 may be connected to the second ground terminal.

The first isolated converter 120 according to an embodiment of the disclosure may be connected to the rectifier 110 in parallel or in series. The first isolated converter 120 may convert the rectified DC power from the rectifier 110 to a power having predetermined intensity based on the second ground.

The second isolated converter 130 may be connected in parallel with the first isolated converter 120. The second isolated converter 130 may convert the rectified DC power from the rectifier 110 into a power having predetermined intensity based on the second ground.

The electronic device 100 according to an embodiment of the disclosure may supply power to the display apparatus 200. As an example, the converters 120 and 130 of the electronic device 100 may supply power to the display apparatus 200 based on the second ground. The display apparatus 200 may be connected to the same ground as the second ground and may be driven using power supplied from the electronic device 100. The second ground is a ground different from the earth ground.

The electronic device 100 according to an embodiment of the disclosure may supply at least one of driving power required for driving the display apparatus 200 or standby power required for a standby state of the display apparatus 200. For example, the first isolated converter 120 may convert DC power into driving power of the display apparatus 200 based on the second ground, and the second isolated converter 130 may convert DC power into standby power of the display apparatus 200. The second ground may, for example, be a frame ground FGND different from the earth ground. The frame ground may be referred to as a chassis ground or the like, and will referred to as a frame ground hereinafter for convenience.

The electronic device 100 according to an embodiment of the disclosure may include the first interface 140. The first interface 140 may be connected to the display apparatus 200 and may transmit, for example, power, signals, data, and the like to the display apparatus 200. For example, the first interface 140 may be implemented as a power source terminal and transmit at least one of the driving power and the standby power to the display apparatus 200. However, the disclosure is not limited thereto, and the electronic device 100 may transmit power and signals to the display apparatus 200 through the first interface 140 in which a power source terminal, a signal terminal, and the like are integrated. In addition, each of the first interface 140 and the display apparatus 200 may be connected to the same second ground.

The display apparatus 200 according to an embodiment of the disclosure may receive power from the electronic device 100 and operate using the received power, rather than having a power supply line or the like for connection to a power outlet that provides commercial power.

For example, the display apparatus 200 may convert the driving power, standby power, and the like received from the electronic device 100, and operate using the converted power. For example, an internal component of the display apparatus 200 may be connected to the second ground terminal and may convert power received from the electronic device 100 using non-isolated conversion. Details thereof will be described with reference to FIG. 3 below.

Figure 3:
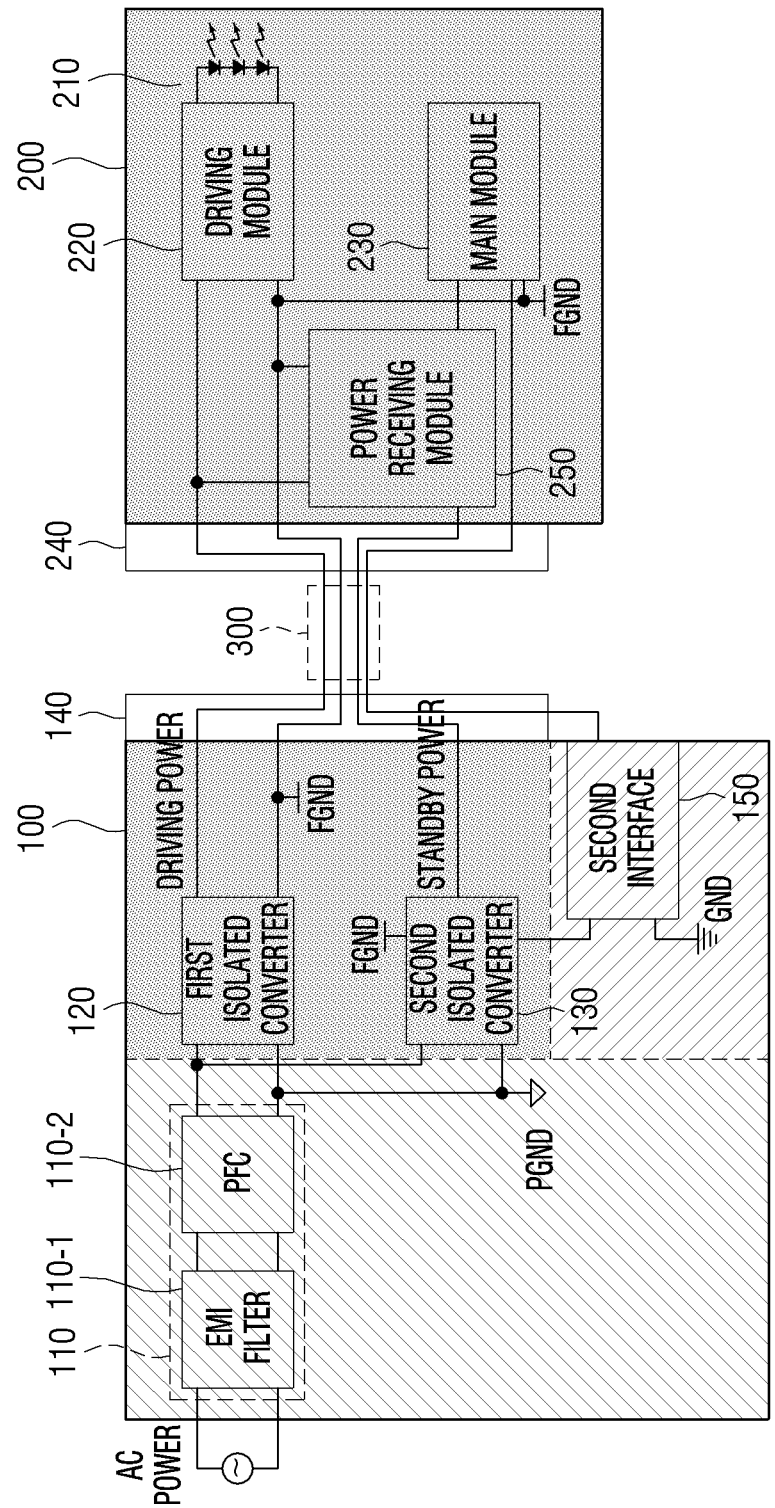
FIG. 3 is a block diagram illustrating an example configuration of the electronic device and the display apparatus illustrated in FIG. 1 according to an embodiment of the disclosure.

FIG. 3 is a block diagram illustrating an example configuration of the electronic device and the display apparatus shown in FIG. 1.

Referring to FIG. 1, the electronic device 100 may include a second interface 150. A detailed description of the same components as those shown in FIG. 1 will not be repeated here.

The second interface 150 may receive an input signal from a plurality of external devices. The second interface 150 may receive an input signal from a plurality of external devices using at least one of wired/wireless methods. The wired method may, for example, be implemented by an RF cable, an HDMI, a DVI, a component, a wired Ethernet or the like, and the wireless method may be implemented by Wi-fi, an antenna, Bluetooth or the like, but is not limited thereto.

For example, the second interface 150 may be implemented as an input terminal according to an HDMI standard and may be connected to a set-top box to receive an input signal. The second interface 150 may be implemented as a Wi-Fi communication module, receive input signals from various streaming services and be provided with content.

For example, the second interface 150 may be connected to ground. Because the external device connected to the electronic device 100 through the second interface 150 is connected to the earth ground, the second interface 150 may be connected to the earth ground differently from the other components of the electronic device 100. For example, the second interface 150 according to an embodiment of the disclosure may be grounded independently of the other components in the electronic device 100. The earth ground may be referred to as a ground, an earth, or the like, but is hereinafter referred to as an earth ground GND for convenience of explanation.

When an external device is connected through the second interface 150, the second isolated converter 130 according to an embodiment of the disclosure may convert the DC power output from the rectifier 110 into power based on the earth ground and output the converted power to the second interface 150. For example, as the power converted by the second isolated converter 130 is supplied to the second interface 150, the second interface 150 may receive a signal from the connected external device.

The electronic device 100 may transmit an input signal received from an external device through the second interface 150 to the display apparatus 200 through the first interface 140. Accordingly, the display apparatus 200 may be driven using the power received from the electronic device 100 and display the signal received from the electronic device 100.

Referring to FIG. 3, the display apparatus 200 includes a display 210, a driving module (e.g., including driving circuitry) 220, a main module (e.g., including control circuitry) 230, an interface 240, and a power receiving module (e.g., including power receiving circuitry) 250.

The display 210 may, for example, be a liquid crystal display (LCD), an organic light emitting diode (OLED), an active-matrix OLED (AMOLED), a plasma display panel (PDP), a quantum dot (QD), a micro LED, or the like.

The driving module 220 according to an embodiment of the disclosure may include various driving circuitry that drives the display 210. For example, the driving module 220 may drive each pixel configuring the display 210 by applying a driving voltage to each pixel or causing a driving current to flow in each pixel under the control of the main module 230. The display 210 may be referred to as a display panel and the driving module 220 may be referred to as a panel driving unit. The display 210 and the driving module 220 may be referred to as the display 210 and the driving module 220, respectively.

The main module 230 may include various control circuitry and generally controls the operation of the display apparatus 200.

According to an embodiment, the main module 230 may include various control circuitry, such as, for example, and without limitation, one or more of a central processing unit (CPU), a microcontroller unit (MCU), a micro processing unit (MPU), a controller, an application processor (AP), a communication processor (CP), an ARM processor, or the like, or may be defined by the corresponding term.

The main module 230 may, for example, be realized as a system on chip (SoC), with a built-in processing algorithm, a large scale integration (LSI), or a field programmable gate array (FPGA).

The main module 230 according to an embodiment of the disclosure may display a signal received from the electronic device 100 through the display 210.

The interface 240 may be connected to the electronic device 100 to receive power, signals, data, and the like. In an example, the interface 240 may be realized as a power terminal to receive power from the electronic device 100. However, without being limited thereto, the display apparatus 200 may receive power and signals from the electronic device 100 through the interface 240 in which a power terminal, a signal terminal, and the like are integrated.

The display apparatus 200 according to an embodiment of the disclosure may be configured to receive power through the electronic device 100 and operate using the same, without a power supply line or the like for connection to a power outlet providing commercial power.

For example, the interface 240 may be connected to the same ground as the electronic device 100. For example, a ground which is connected to the display apparatus 200 and to which the first interface 140 of the electronic device 100 supplying power to the display apparatus 200 is connected and a ground to which the interface 240 of the display apparatus 200 is connected may be the same.

The interface 240 according to an embodiment of the disclosure may receive at least one of driving power source and standby power from the electronic device 100.

The power receiving module 250 may include various power receiving circuitry and be connected to the interface 240. The power receiving module 250 may supply the power received by the interface 240 from the electronic device 100 to each component of the display apparatus 200. For example, the power receiving module 250 may be connected to the same ground as the electronic device 100. For example, it may be assumed that the first interface 140 of the electronic device 100 is connected to the second ground and the interface 240 and the power receiving module 250 of the display apparatus 200 are connected to the second ground. The second ground may be a ground different from the earth ground GND.

The power receiving module 250 according to an embodiment of the disclosure may include various power receiving circuitry, such as, for example, and without limitation, a non-isolated converter (not shown) and a controller (not shown), or the like.

The non-isolated converter may convert the received power to a power having predetermined intensity. For example, the non-isolated converter may convert the driving power received from the electronic device 100 into a power having an intensity suitable for driving the display apparatus 200 and provide the converted power to the display 210, the driving module 220, and the main module 230. In another example, the non-isolated converter may convert standby power received from the electronic device 100 into a power having an intensity required for the standby state of the display apparatus 200 and provide the converted power to the main module 230.

The controller may control an overall operation of the power receiving module 250. According to an embodiment, the controller may include, for example, and without limitation, one or more of a microprocessor, a central processing unit (CPU), a microcontroller unit (MCU), a micro processing unit (MPU), a controller, an application processor (AP), a communication processor (CP), an ARM processor, or the like, or may be defined as a corresponding term. In addition, the controller may be realized as a system on chip (SoC) with a processing algorithm embedded therein, a large scale integration (LSI), or a field programmable gate array (FPGA).

According to an embodiment, the display apparatus 200 may operate in first and second modes. The first mode may, for example, be a normal mode (or a driving mode), and the second mode may, for example, be a standby mode. If the display apparatus 200 is in the first mode, the controller may control the power receiving module 250 to provide driving power to the display apparatus 200. As another example, if the display apparatus 200 is in the second mode, the controller may control the power receiving module 250 to provide standby power to the display apparatus 200.

For example, it may be assumed that driving power and standby power are received from the electronic device 100 through the interface 240. The controller may control the power receiving module 250 to provide either the driving power or the standby power to be provided to the components in the display apparatus 200 according to a mode of the display apparatus 200.

According to an embodiment of the disclosure, the driving power and the standby power received from the electronic device 100 may be converted powers based on the second ground. For example, because the display apparatus 200 is connected to the second ground terminal, the power received from the electronic device 100 may be converted using a non-isolated converter. Each internal component of the display apparatus 200 according to an embodiment of the disclosure may be connected to the same ground as the electronic device 100. For example, it may be assumed that the display apparatus 200 is connected to the first interface 140 of the electronic device 100 and receives power and signals through the first interface 140. When the first interface 140 of the electronic device 100 is connected to the second ground, each internal component of the display apparatus 200 may be connected to the second ground. The second ground is a ground different from the earth ground GND.

Figure 4:
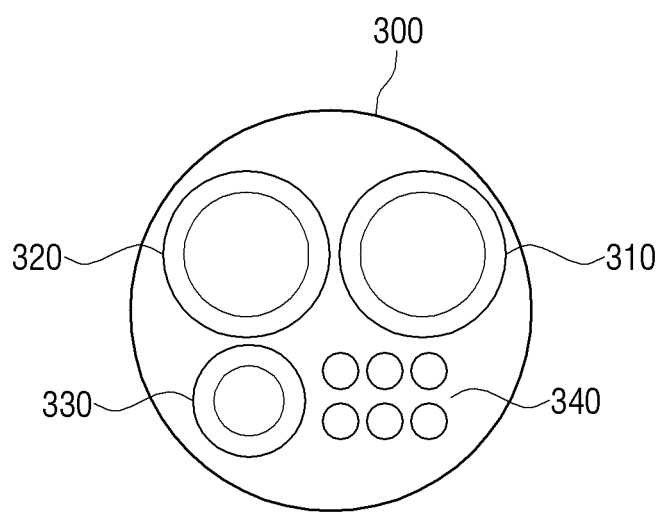
FIG. 4 is a diagram illustrating an example configuration of a single cable according to an embodiment of the disclosure.

FIG. 4 is a diagram illustrating an example configuration of a single cable according to an embodiment of the disclosure.

As illustrated in FIGS. 1, 2 and 3, the first interface 140 provided in the electronic device 100 and the interface 240 provided in the display apparatus 200 may be connected through a single cable 300.

The single cable may include a ground line 310 corresponding to the second ground, a first voltage line 320 for transmitting driving power, and a second voltage line 330 for transmitting standby power. FIG. 4 is a cross-sectional view of the single cable 300.

Referring to FIG. 4, according to an embodiment, the single cable 300 may include an optical cable 340. A signal received from an external device through the second interface 150 may be transmitted to the display apparatus 200 via the first interface 140 and the optical cable 340.

In the related art, the display apparatus 200 is grounded to the ground and is supplied with isolated power from an adapter, an electronic device, or the like based on the earth ground. Accordingly, a connection cable between the display apparatus 200 and the electronic device is very thick because it must include all of a ground line corresponding to the earth ground, a voltage line for power supply, and the like. In addition, in order for the display apparatus 200 to receive power from the electronic device, the display apparatus 200 must have an isolated converter in order to isolate power source against the earth ground.

According to an embodiment of the disclosure, the single cable 300 between the electronic device 100 and the display apparatus 200 may be realized to be thinner than the related art. For example, the electronic device 100 and the display apparatus 200 are connected to a ground different from the earth ground, and the display apparatus 200 is not required to isolate power supplied from the electronic device 100 with respect to the earth ground. Therefore, because the single cable 300 does not need to have a ground line corresponding to the earth ground, the single cable 300 may be realized to be thinner than the related art.

Further, because the display apparatus 200 may be connected to a separate independent ground terminal instead of the earth ground, the display apparatus 200 does not need an isolated converter for isolating the driving power and the standby power received from the electronic device 100 with respect to the earth ground.

Figure 5:
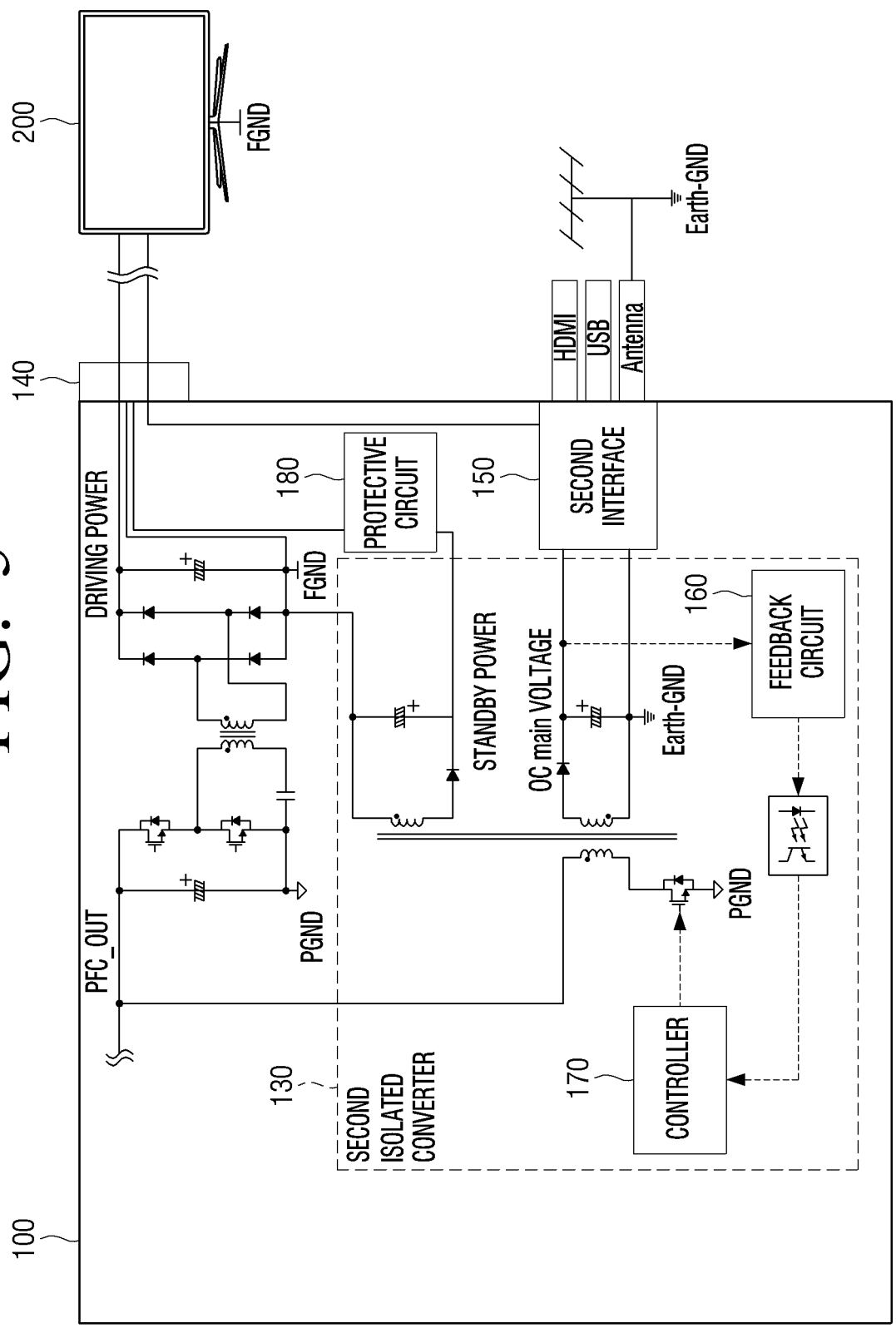
FIG. 5 is a circuit diagram illustrating an example configuration of an isolated converter illustrated in FIG. 1 according to an embodiment of the disclosure.

FIG. 5 is a circuit diagram illustrating an example configuration of the isolated converter illustrated in FIG. 1 according to an embodiment of the disclosure.

Referring to FIG. 5, the secondary sides of the second isolated converter 130 may be connected to different ground terminals, respectively.

For example, in the second isolated converter 130, an output terminal connected to the first interface 140 may be connected to a second ground terminal and an output terminal connected to the second interface 150 may be connected to the earth ground (or ground).

According to an embodiment of the disclosure, the second isolated converter 130 may be connected in parallel with the rectifier 110 and receive the DC power output from the rectifier 110. An input terminal provided in the second isolated converter 130 may be connected to the same first ground terminal as the first isolated converter 120. One of the output terminals may be connected to the second ground terminal and the other may be connected to earth ground (GND). For example, the output terminal connected to the earth ground GND may be connected to the second interface 150. The second interface 150 may be connected to an antenna, a set-top box (using an HDMI or the like), a USB, or the like and the external device is in a state of being grounded.

According to an embodiment, the second isolated converter 130 may convert the DC power into standby power based on the second ground and output the converted power to the first interface 140 and convert the DC power into power based on the earth ground and output the converted power to the second interface 150.

The first isolated converter 120 may convert the DC power into driving power based on the second ground and output the converted power to the first interface 140.

The electronic device 100 according to an embodiment of the disclosure may further include a feedback circuit 160, a controller 170, and a protective circuit 180.

The feedback circuit 160 may identify a size of a load of an external device connected to the second interface 150.

The controller 170 may include various control or processing circuitry and controls an overall operation of the electronic device 100.

According to an embodiment, the controller may include, for example, and without limitation, one or more of a central processing unit (CPU), a microcontroller unit (MCU), a micro processing unit (MPU), a controller, an application processor (AP), a communication processor (CP), an ARM processor, or the like, or may be defined as a corresponding term. In addition, the controller 170 may be realized as a system on chip (SoC) with a processing algorithm embedded therein, a large scale integration (LSI), or a field programmable gate array (FPGA).

For example, the controller 170 may control the second isolated converter 140. In an example, the controller 170 may control intensity of the power output through the second isolated converter 140 based on a magnitude of a load identified by the feedback circuit 160. For example, the controller 170 may control the intensity of the power output through the second isolated converter 140 and power proportional to the magnitude of the load may be supplied to the second interface 150.

The protective circuit 180 may identify whether the power provided to the display apparatus 200 exceeds a predetermined threshold value. For example, the protective circuit 180 may identify whether at least one of the driving power and the standby power exceeds over voltage protection (OVP). The predetermined threshold value, which is power as high as to cause damage to a circuit in the display apparatus 200, may be related to a breakdown voltage (rated voltage) of a capacitor. In an example, the predetermined threshold value may be determined as the breakdown voltage of the capacitor provided in the protective circuit 180, and the breakdown voltage of the capacitor may, for example, be about 1.5 times (about 400 V) an upper limit of a commercial voltage range (e.g., 90 to 264 V). However, the threshold value is not limited thereto and may be set to vary according to purposes of manufacturers.

The protective circuit 180 according to an embodiment may interrupt supply of power if the power provided to the display apparatus 200 exceeds the predetermined threshold value.

Figure 6:
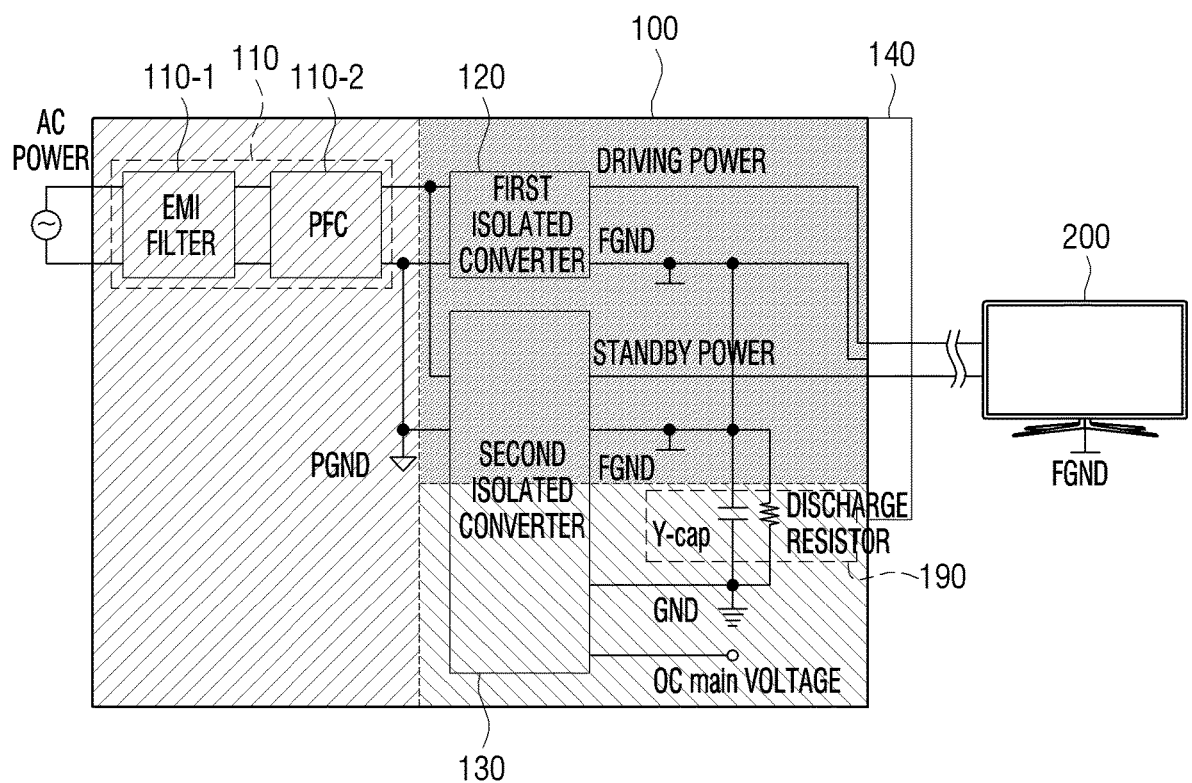
FIG. 6 is a block diagram illustrating an example configuration of an electronic device according to an embodiment of the disclosure.

FIG. 6 is a block diagram illustrating an example configuration of an electronic device according to an embodiment of the disclosure.

Referring to FIG. 6, a common mode (CM) noise may occur in the display apparatus 200 because the display apparatus 200 is connected to an independent ground different from the earth ground.

The electronic device 100 according to an embodiment of the disclosure may include a CM filter 190 for canceling common noise.

In an example, as illustrated in FIG. 6, the electronic device 100 may include a capacitor and a resistor connected to the second ground and the earth ground. The capacitor may cancel common-mode noise and store energy. The resistor may be a component for discharging energy stored in the capacitor. For example, the resistor may be realized as a resistor having a magnitude in units of Mohm [MΩ].

According to an embodiment, the CM noise may spread with a large loop even for a small noise current, and noise between systems may adversely affect the circuit. Therefore, noise may be canceled through the CM filter 190.

Figure 7:
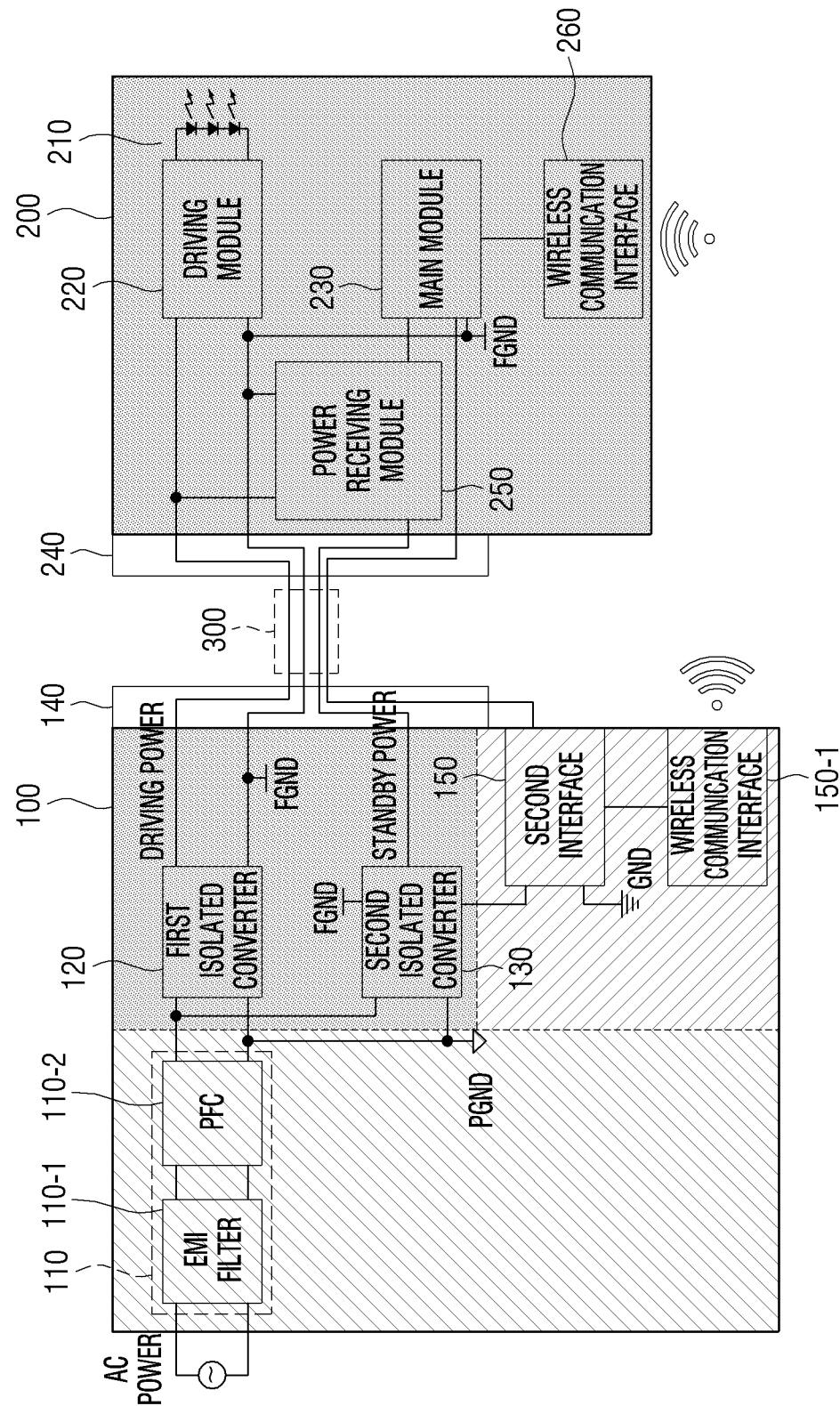
FIG. 7 is a block diagram illustrating an example configuration of an electronic device according to another embodiment of the disclosure.

FIG. 7 is a block diagram illustrating an example configuration of an electronic device according to another embodiment of the disclosure.

Referring to FIG. 7, the electronic device 100 may include a wireless communication interface (e.g., including wireless communication circuitry) 150-1 connected to the second interface 150.

The wireless communication interface 150-1 may perform communication with an external device through a communication method such as, for example, and without limitation, Wi-Fi, Bluetooth, Zigbee, wireless local area network (WLAN), wide area network (WAN), Ethernet, or the like.

For example, the wireless communication interface 150-1 may transmit a signal received from the external device to the display apparatus 200 through the second interface 150.

The display apparatus 200 according to an embodiment of the disclosure may include a wireless communication interface (e.g., including wireless communication circuitry) 260.

The wireless communication interface 260 may perform communication with an external device through a communication method such as, for example, and without limitation, Wi-Fi, WLAN, Bluetooth, Zigbee, WAN, Ethernet, or the like. However, the disclosure is not limited thereto and the wireless communication interface 260 may receive content from the external server or the like in a streaming or downloading manner.

For example, the wireless communication interface 260 may receive a signal from the electronic device 100. The main module 230 may display the signal received via the wireless communication interface 260 through the display 210.

According to another embodiment, even without an optical cable in the single cable 300, the display apparatus 200 may receive and display a signal from the electronic device 100 via the wireless communication interface 260 and display the received signal.

Figure 8:
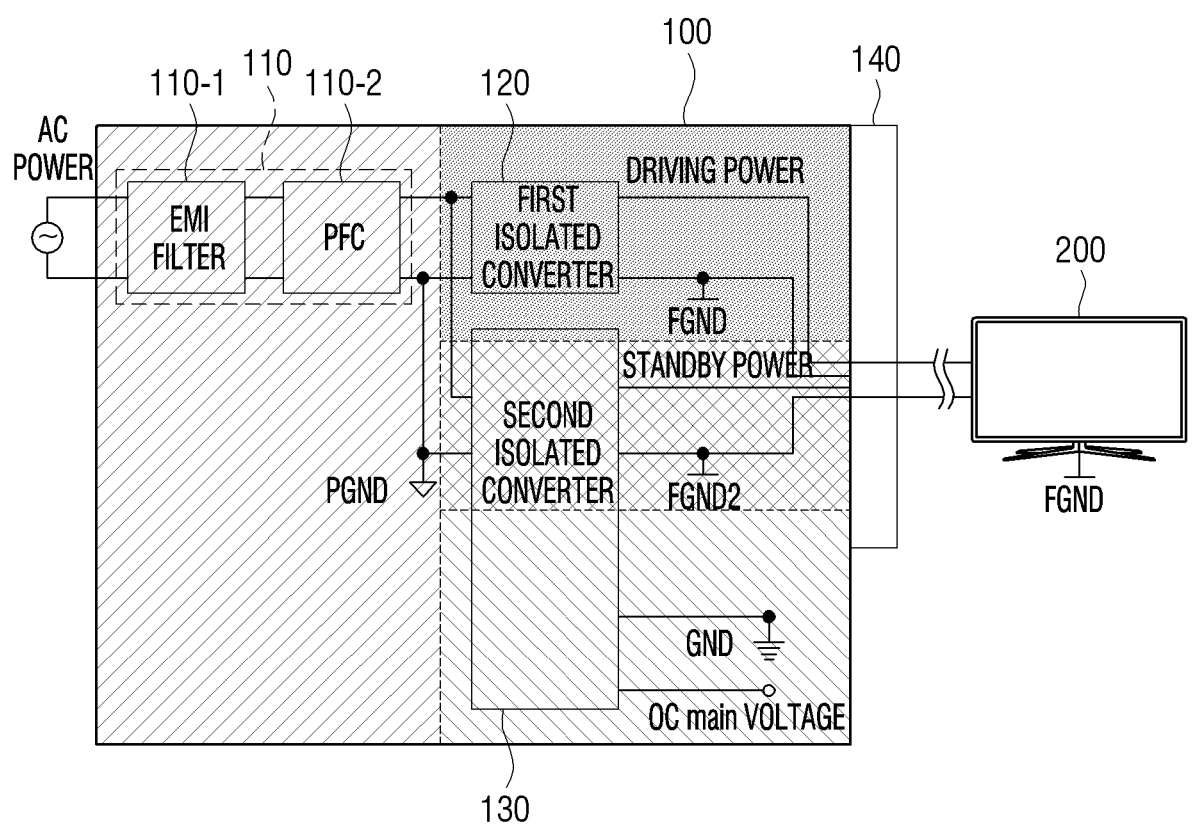
FIG. 8 is a diagram illustrating an example electronic device according to another embodiment of the disclosure.

FIG. 8 is a diagram illustrating an example electronic device according to another embodiment of the disclosure.

Referring to FIG. 8, the first isolated converter 120 may convert DC power to driving power based on the second ground and output the converted DC power to the first interface 140. In addition, the second isolated converter 130 may convert the DC power to standby power based on the third ground and output the converted DC power to the first interface 140. The third ground may refer to a ground terminal different from the second ground.

According to various embodiments, the driving power and the standby power may be isolated based on the second ground (e.g., FGND) and the third ground (e.g., FGND2), respectively, in consideration of, for example, EMI, a leakage current, CM noise, or the like.

Figure 9:
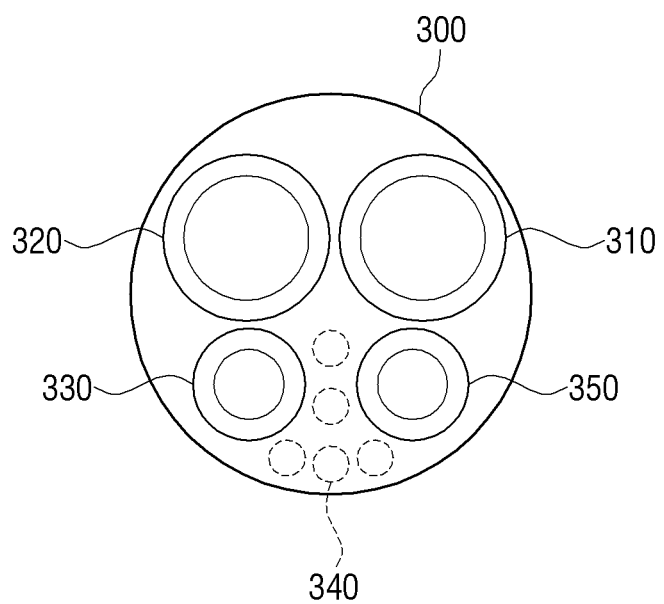
FIG. 9 is a diagram illustrating an example configuration of a single cable according to another embodiment of the disclosure.

FIG. 9 is a diagram illustrating an example configuration of a single cable according to another embodiment of the disclosure.

When the driving power and the standby power are isolated based on different grounds as illustrated in FIG. 8, a single cable 300 may further include a ground line 350 corresponding to the third ground in addition to the ground line 310 corresponding to the second ground, the first voltage line 320 transmitting the driving power, and the second voltage line 330 transmitting the standby power. FIG. 9 is a cross-sectional view of a single cable 300 according to another embodiment of the disclosure.

Figure 10:
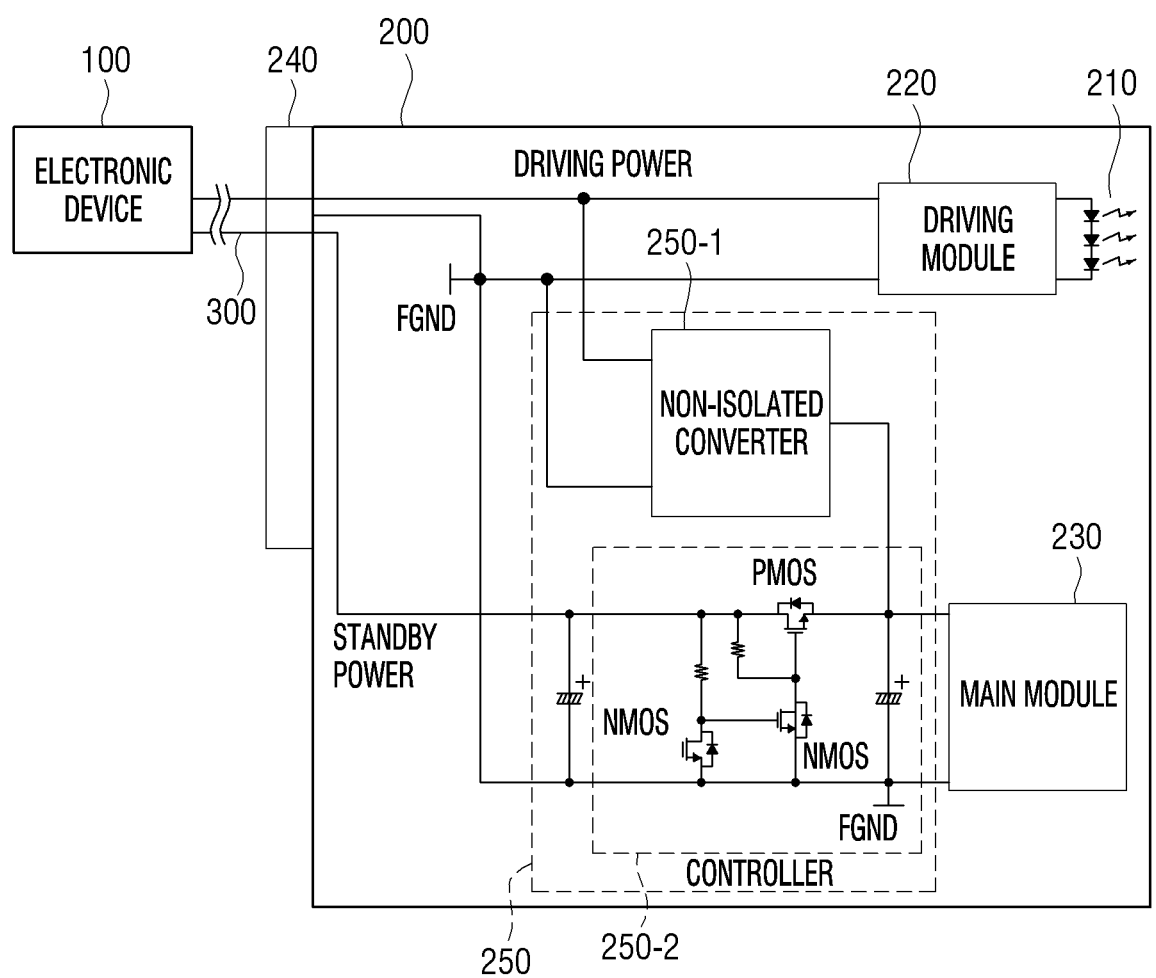
FIG. 10 is a circuit diagram illustrating an example configuration of a display apparatus according to an embodiment of the disclosure.

FIG. 10 is a circuit diagram illustrating an example configuration of a display apparatus according to an embodiment of the disclosure.

The power receiving module 250 of the display apparatus 200 according to an embodiment of the disclosure may include a non-isolated converter 250-1 and a controller 250-2.

According to an embodiment, an internal component or circuit of the display apparatus 200 may be connected to an independent ground terminal, rather than being grounded to a ground. For example, an internal component of the display apparatus 200 may be connected to the second ground terminal. When power isolated based on the second ground (e.g., FGND) is received from the electronic device 100, the display apparatus 200 may convert the received power using only the non-isolated converter 250-1, rather than using the isolated converter, and may be driven using the converted power.

Further, when the driving power and the standby power are received from the electronic device 100, the display apparatus 200 may convert the driving power or the standby power using the non-isolated converter 250-1 based on a mode of the display apparatus 200 and provide the converted power to an internal component thereof. The mode of the display apparatus 200 may be a driving mode or a standby mode. When the display apparatus 200 is in the driving mode, the display apparatus 200 may convert the driving power received from the electronic device 100 using the non-isolated converter 250-1, and when the display apparatus 200 is in the standby mode, the display apparatus 200 may convert the standby power using the non-isolated converter 250-1.

According to an embodiment, the display apparatus 200 may be connected to the electronic device 100 through the single cable 300. The single cable 300 may include a ground line, a first voltage line transmitting driving power, and a second voltage line transmitting standby power. However, the disclosure is not limited thereto and the single cable 300 may include only the ground line and the first voltage line transmitting driving power. That is, the single cable 300 may include a ground line corresponding to the independent ground terminal (e.g., FGND) to which the electronic device 100 and the display apparatus 200 are connected in the same manner, rather than a ground line corresponding to an earth ground.

The controller 250-2 included in the power receiving module 250 may control the driving power and/or the standby power received through the interface 240 to be provided to the components of the display apparatus 200.

For example, the display apparatus 200 may include a first mode corresponding to a normal mode and a second mode corresponding to a standby mode. When the display apparatus 200 is in the first mode, the controller 250-2 may convert the driving power, among the driving power and the standby power, received through the interface 240 by the non-isolated converter 250-1 and provide the converted power to the driving module 220 and the main module 230. If the display apparatus 200 is in the second mode, the controller 250-2 may convert the standby power through the non-isolated converter 250-1 and provide the converted power to the main module 230.

The first and second modes are examples and are not limited to the case that the controller 250-2 selects and provides any one of the driving power and the standby power according to a specific mode of the display apparatus 200 like the normal mode and the standby mode. For example, when a PS_ON signal indicating driving of the display apparatus 200 is received, the controller 250-2 may convert the driving power through the non-isolated converter 250-1 and provide the converted power to the driving module 220 and the main module 230. In addition, if the PS_ON signal is not received, the controller 250-2 may convert the standby power through the non-isolated converter 250-1 and provide the converted power to the main module 230.

For example, it may be assumed that a standby power larger than the driving power is received from the electronic device 100 due to an abnormal operation. The related art display apparatus needs to be designed such that an internal circuit receiving standby power has a high power rating in preparation of such an abnormal operation. The display apparatus 200 according to an embodiment of the disclosure may provide either the driving power source or the standby power source to an internal module of the display apparatus 200 by the controller 250-2 based, for example, on a mode, a signal, or the like.

Figure 11A:
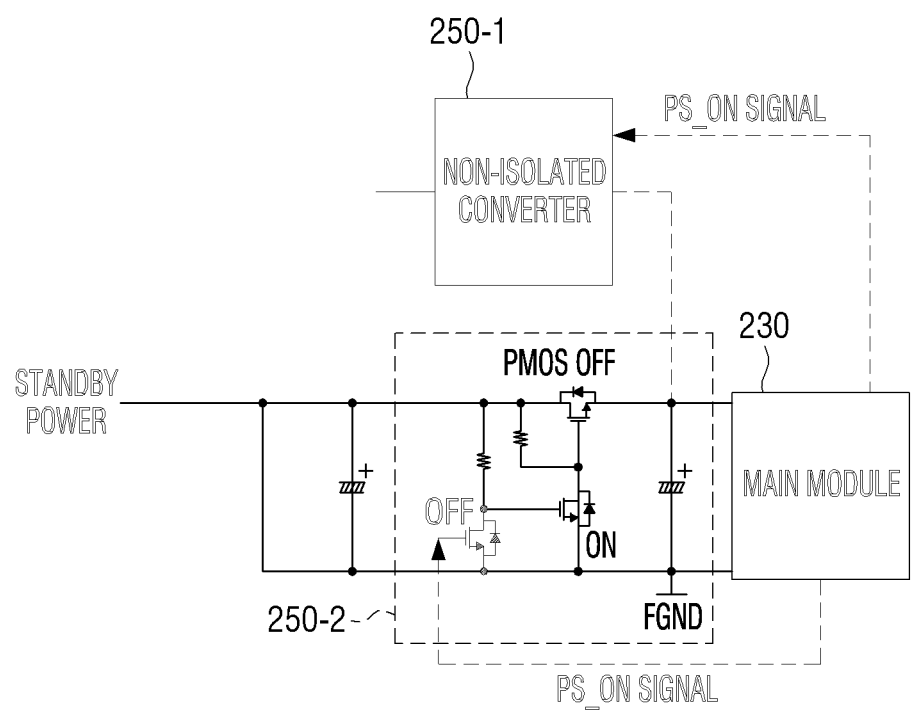
FIG. 11A is a circuit diagram illustrating an example power receiving module according to an embodiment of the disclosure.

FIG. 11A is a circuit diagram illustrating an example power receiving module according to an embodiment of the disclosure.

Referring to FIG. 11A, when the display apparatus 200 is in the standby mode, the controller 250-2 may provide the standby power, among the driving power and the standby power, to the main module 230.

For example, if the PS_ON signal is absent, the controller 250-2 may provide the standby power to the main module 230 and control the non-isolated converter 250-1 not to convert the driving power.

Figure 11B:
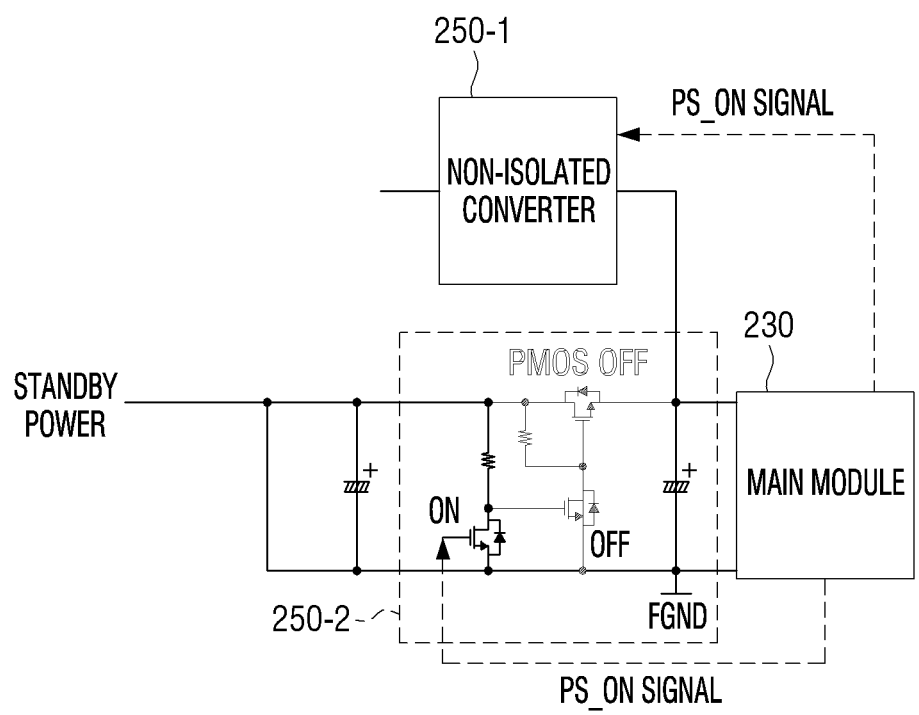
FIG. 11B is a circuit diagram illustrating an example power receiving module according to an embodiment of the disclosure.

FIG. 11B is a circuit diagram illustrating an example power receiving module according to another embodiment of the disclosure.

Referring to FIG. 11B, when the display apparatus 200 is in the normal mode, the controller 250-2 may provide the driving power, among the driving power and the standby power, to the driving module 220 and the main module 230.

For example, when the PS_ON signal is received, the controller 250-2 may turn off the standby power and control the non-isolated converter 250-1 to convert the driving power. Accordingly, the driving power may be supplied to the driving module 220 and the main module 230, and the display apparatus 200 may operate. In addition, the display apparatus 200 may output a signal received from the electronic device 100 through the display 210. The power receiving module 250 may also be referred to as a power selector or the like. In the disclosure, the power receiving module 250 is used for the purposes of description.

Figure 12:
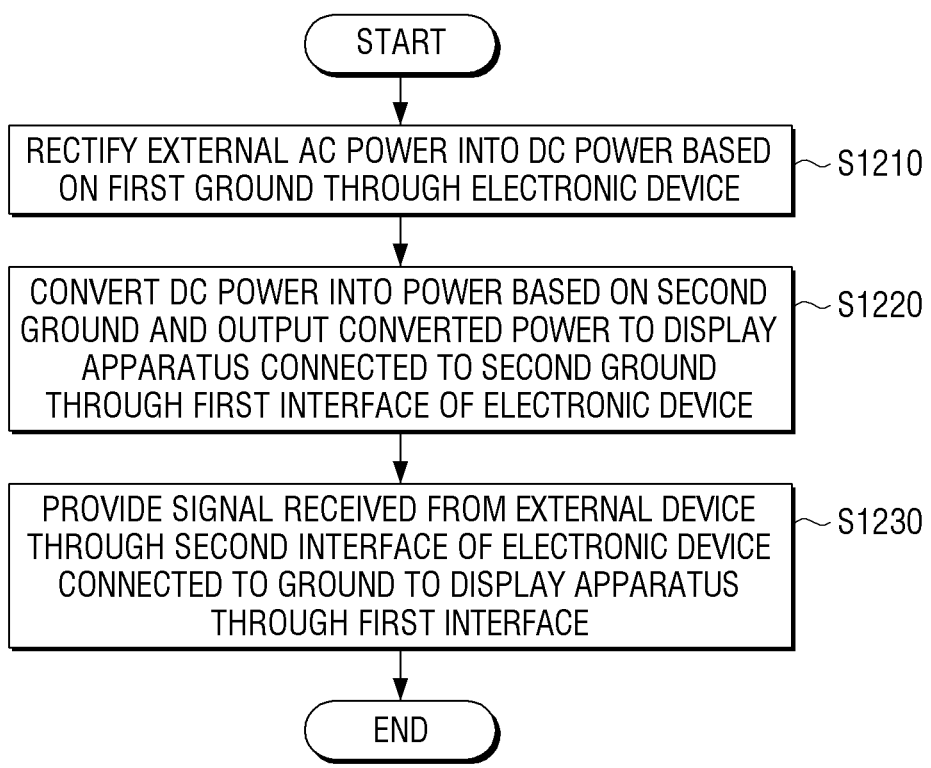
FIG. 12 is a flowchart illustrating an example method of controlling a display system according to an embodiment of the disclosure.

FIG. 12 is a flowchart illustrating an example method of controlling a display system including an electronic device and a display apparatus according to an embodiment of the disclosure.

External AC power source is rectified through the electronic device to DC power based on the first ground (S1210).

The DC power is converted into a power based on the second ground and output to the display apparatus through the first interface connected to the second ground (S1220).

A signal received from the external device through the second interface connected to an earth ground is provided to the display apparatus through the first interface (S1230). A ground of the display apparatus may be the same as the second ground, and the second ground is a ground different from the earth ground.

Further, the electronic device may include first and second isolated converters, and operation S1220 of converting the DC power to a power based on the second ground and outputting the converted power to the display apparatus may include converting the DC power to a driving power based on the second ground through the first isolated converter and outputting the converted driving power to the display apparatus and converting the DC power to a standby power based on the second ground through the second isolated converter and outputting the converted standby power to the display apparatus. In addition, the display apparatus may include a non-isolated converter, and the control method according to an embodiment may include converting either the driving power or the standby power through the non-isolated converter based on a mode of the display apparatus.

The method according to an embodiment may include converting the DC power into power based on the earth ground through the second isolated converter and outputting the converted power to the second interface. The method according to an embodiment may include identifying a size of a load of an external device connected to the second interface and controlling an intensity of the power output through the second isolated converter based on the size of the load.

The first interface according to an embodiment may be connected to the display apparatus through a single cable including a ground line corresponding to the second ground, a first voltage line transmitting driving power, a second voltage line transmitting standby power, and an optical cable transmitting a signal received from an external device.

An electronic device according to an embodiment may include a capacitor and a resistor connected to the second ground and the ground. A method according to an embodiment may include filtering noise received from the display apparatus using a capacitor and a resistor.

The method according to an embodiment may include transmitting a signal received from the external device to the display apparatus through the wireless communication interface of the electronic device.

The first ground may be a power ground and the second ground may be a frame ground.

The method according to an embodiment may include interrupting providing of power if the power provided to the display apparatus exceeds a predetermined threshold value.

The display and the method of controlling the display apparatus including the driving module and the main module for controlling driving of the display according to an embodiment of the disclosure receive driving power and standby power from an external electronic device.

When the display apparatus is in the first mode, the driving power, among the driving power and the standby power, is converted through the non-isolated converter and provided to the driving module and the main module.

When the display apparatus is in the second mode, the standby power is converted through the non-isolated converter and provided to the main module.

The receiving may include receiving the driving power and the standby power from an electronic device connected through a single cable including a ground line, a first voltage line transmitting driving power, and a second voltage line transmitting standby power.

The various example embodiments described above may be implemented in a computer or similar device-readable recording medium using software, hardware, or a combination thereof. In some cases, the embodiments described in the disclosure may be implemented by a processor itself. In case of software implementation, embodiments such as procedures and functions described in this disclosure may be implemented as separate software modules. Each of the software modules may perform one or more functions and operations described in this disclosure.

Computer instructions for performing the processing operations according to various embodiments of the disclosure described above may be stored in a non-transitory computer-readable medium. The computer instructions stored on such a non-transitory computer-readable medium may cause a particular device to perform processing operations according to various embodiments described above when executed by a processor.

A non-transitory computer-readable medium refers to a medium that semi-permanently stores data and can be read by a device. For example, the non-transitory computer-readable medium may include a CD, DVD, hard disk, Blu-ray disc, USB, memory card, or ROM.

While the disclosure has been illustrated and described with reference to various example embodiments thereof, one skilled in the art will understand that the various example embodiments are intended to be illustrative, not limiting, and that various changes in form and details may be made without departing from the true spirit and full scope of the disclosure.

What is claimed is:

1. A display system comprising:
   a display apparatus including a display; and
   an electronic device including a first interface configured to be connected to the display apparatus, a second interface configured to be connected to an external device, a rectifier and an isolated power converter,
   wherein the electronic device is configured to:
   rectify, using the rectifier, external alternating current (AC) power to direct current (DC) power based on a first ground;
   convert, using the isolated power converter, the DC power into power based on a second ground;
   provide the converted power to the display apparatus through the first interface connected to the second ground; and
   based on a signal being received from the external device through the second interface connected to an earth ground, provide the signal to the display apparatus through the first interface connected to the second ground, wherein the earth ground is different from the first ground,
   wherein a ground of the display apparatus is the same as the second ground and the second ground is different from the earth ground.

2. The display system as claimed in claim 1, wherein the isolated power converter includes:
   first and second isolated power converters wherein
   the first isolated power converter is configured to convert the DC power into driving power based on the second ground and outputs the converted driving power to the display apparatus through the first interface and
   the second isolated power converter is configured to convert the DC power into standby power based on the second ground and to output the converted standby power to the display apparatus through the first interface, and
   wherein the display apparatus includes a non-isolated power converter and is configured to convert any one of the driving power and the standby power through the non-isolated converter based on a mode of the display apparatus.

3. The display system as claimed in claim 2, wherein the second isolated power converter is configured to convert the DC power into power based on the earth ground and to output the converted power to the second interface.

4. The display system as claimed in claim 3, wherein the electronic device further includes:
   a feedback circuit configured to identify a size of a load of the external device connected to the second interface; and
   a controller configured to control an intensity of power based on the earth ground output through the second isolated converter based on the size of the load.

5. The display system as claimed in claim 2, wherein the first interface is configured to be connected to the display apparatus through a single cable, the single cable including a ground line corresponding to the second ground, a first voltage line configured to deliver the driving power, a second voltage line configured to deliver the standby power, and an optical cable configured to deliver the signal received from the external device.

6. The display system as claimed in claim 1, wherein the electronic device includes a capacitor and a resistor connected to the second ground and the earth ground, and is configured to filter noise received from the display apparatus using the capacitor and the resistor.

7. The display system as claimed in claim 1, wherein the electronic device includes a wireless communication interface and is configured to provide a signal received from the external device to the display apparatus through the wireless communication interface.

8. The display system as claimed in claim 1, wherein the first ground includes a power ground and the second ground includes a frame ground.

9. The display system as claimed in claim 1, wherein the electronic device includes a protective circuit configured to interrupt provision of power provided to the display apparatus through the first interface based on the power exceeding a predetermined threshold value.

10. A display apparatus comprising:
    a display;
    a main module comprising control circuitry;
    a driving module comprising driving circuitry configured to control driving of the display;
    an interface connected to an external electronic device and configured to receive DC driving power, DC standby power and an image signal from the external electronic device; and
    a power receiving module comprising a non-isolated converter and a controller,
    wherein the controller is configured to convert the DC driving power received from the external electronic device through the interface, through the non-isolated converter and provide the converted DC driving power to the driving module and the main module based on the display apparatus being in a first mode, and provide the DC standby power received from the external electronic device through the interface to the main module based on the display apparatus being in a second mode,
    wherein a ground of the power receiving module is different from an earth ground.

11. A method of controlling a display system including an electronic device and a display apparatus, the electronic device including a first interface configured to be connected to the display apparatus, a second interface configured to be connected to an external device, a rectifier and an isolated power converter, the method comprising:
    rectifying, using the rectifier, external alternating current (AC) power to direct current (DC) power based on a first ground through the electronic device;
    converting, using the isolated power converter, the DC power into power based on a second ground and providing the converted power to the display apparatus through the first interface connected to the second ground; and based on a signal being received from the external device through the second interface connected to an earth ground, providing the signal to the display apparatus through the first interface connected to the second ground, wherein the earth ground is different from the first ground, wherein a ground of the display apparatus is the same as the second ground and the second ground is different from the earth ground.

12. The method as claimed in claim 11, wherein the isolated power converter includes first and second isolated power converters, and the converting of the DC power into power based on the second ground and providing the converted power to the display apparatus includes:

converting the DC power into driving power based on the second ground and outputting the converted driving power to the display apparatus through the first isolated power converter; and converting the DC power into standby power based on the second ground and outputting the converted standby power to the display apparatus through the second isolated power converter, wherein the display apparatus includes a non-isolated power converter and converts any one of the driving power and the standby power through the non-isolated converter based on a mode of the display apparatus.

13. The method as claimed in claim 12, further comprising:

converting the DC power into power based on the earth ground and outputting the converted power to the second interface through the second isolated converter.

14. The method as claimed in claim 13, further comprising:

identifying a size of a load of the external device connected to the second interface, wherein the converting of the DC power into power based on the ground and outputting the converted power to the second interface includes:

controlling an intensity of power based on the earth ground output through the second isolated converter based on the size of the load.

15. The method as claimed in claim 12, wherein the first interface is connected to the display apparatus through a single cable, the single cable including a ground line corresponding to the second ground, a first voltage line configured to deliver the driving power, a second voltage line configured to deliver the standby power, and an optical cable configured to deliver the signal received from the external device.

16. The method as claimed in claim 11, wherein the electronic device includes a capacitor and a resistor connected to the second ground and the earth ground, the method further comprising:

filtering noise received from the display apparatus using the capacitor and the resistor.

17. The method as claimed in claim 11, further comprising:

providing a signal received from the external device to the display apparatus through a wireless communication interface.

18. The method as claimed in claim 11, wherein the first ground includes a power ground and the second ground includes a frame ground.

19. The method as claimed in claim 11, further comprising:

interrupting provision of power provided to the display apparatus through the first interface based on the power exceeding a predetermined threshold value.

* * * * *